(12) United States Patent
Boyle

(10) Patent No.: US 7,189,428 B1
(45) Date of Patent: Mar. 13, 2007

(54) METHOD FOR SYNTHESIZING THIN FILM ELECTRODES

(75) Inventor: Timothy J. Boyle, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 766 days.

(21) Appl. No.: 10/686,257

(22) Filed: Oct. 14, 2003

(51) Int. Cl.
- B05D 5/12 (2006.01)
- B05D 3/02 (2006.01)
- B05D 3/12 (2006.01)
- H01M 4/88 (2006.01)

(52) U.S. Cl. .................. 427/126.3; 427/240; 427/380; 502/101

(58) Field of Classification Search ............. 427/126.3, 427/240, 380; 502/101
See application file for complete search history.

(56) References Cited

U.S. PATENT DOCUMENTS 3,946,056 A * 3/1976 Thomas ...................... 556/81
5,262,080 A * 11/1993 Smith et al. ........... 252/182.12
5,583,269 A * 12/1996 Morrison et al. ........... 568/851
6,307,078 B1 * 10/2001 Boyle .......................... 556/81
6,414,174 B1   7/2002 Boyle

OTHER PUBLICATIONS

Boyle et al., Chem. Mater. 2003, 15, 3903-3912.
Boyle et al., Sand Report, Sand2002-3615, Nov. 2002.

* cited by examiner

Primary Examiner—Brian K. Talbot
(74) Attorney, Agent, or Firm—Elmer A. Klavetter

(57) ABSTRACT

A method for making a thin-film electrode, either an anode or a cathode, by preparing a precursor solution using an alkoxide reactant, depositing multiple thin film layers with each layer approximately 500–1000 Å in thickness, and heating the layers to above 600° C. to achieve a material with electrochemical properties suitable for use in a thin film battery. The preparation of the anode precursor solution uses $Sn(OCH_2C(CH_3)_3)_2$ dissolved in a solvent in the presence of $HO_2CCH_3$ and the cathode precursor solution is formed by dissolving a mixture of $(Li(OCH_2C(CH_3)_3))_8$ and $Co(O_2CCH_3) \cdot H_2O$ in at least one polar solvent.

6 Claims, 4 Drawing Sheets

METHOD FOR SYNTHESIZING THIN FILM ELECTRODES

This invention was made with Government support under Contract No. DE-AC04-94AL85000 awarded by the Department of Energy. The Government has certain rights in the invention.

BACKGROUND OF THE INVENTION

The present invention relates generally to a method for making electrodes for a battery, and, more particularly, to a solution-route method for making a thin film anode and a thin film cathode for use in a thin film battery.

The development of small, light-weight, power sources is being driven by the need for smaller electronic devices and emerging technologies, such as the autonomous micro- and meso-machines (MEMS) which are be developed for use as early warning detection agents in the fight against terrorism and counter proliferation. Power sources that possess the requisite power and energy to operate these small devices, such as micro-machines, sensors, transmitters, and other electronic circuitry without substantially increasing the final size of the device are necessary to achieve autonomy as well as to aid in the covert nature of some of these devices. Currently, these MEMS devices are being operated by very large power sources, in comparison to the final device size. An integrated power source that will not substantially increase the weight or size of the device that can be conformally added to a device is of high interest. Thin film batteries are an attractive alternative power source for these applications; however, existing thin film batteries are inadequate to meet these needs. Required for development of thin film batteries are materials that can be deposited as thin films for use as electrodes, both anodes and cathodes, where an electrode is a material that can transmit a current and, for practical use, can be cycled as demonstrated by voltammagrams.

Thin film batteries fabricated using a fast, inexpensive solution process approach can be conformally coated onto a variety of surfaces as a thin layer device (thinner than a sheet of paper) and can be designed as an integral part of a system, adding flexibility to the design of technologies, as well as reducing weight of the device without sacrificing mission capabilities. A thin film battery configuration also lends itself to a wide variety of series/parallel interconnect schemes, allowing for wide variability in the performance (for example, power, and run time) of the system.

The solution-based method of the present invention provides means for forming thin film anodes and cathodes required for developed of a thin film battery.

DETAILED DESCRIPTION OF THE INVENTION

Figure 1:
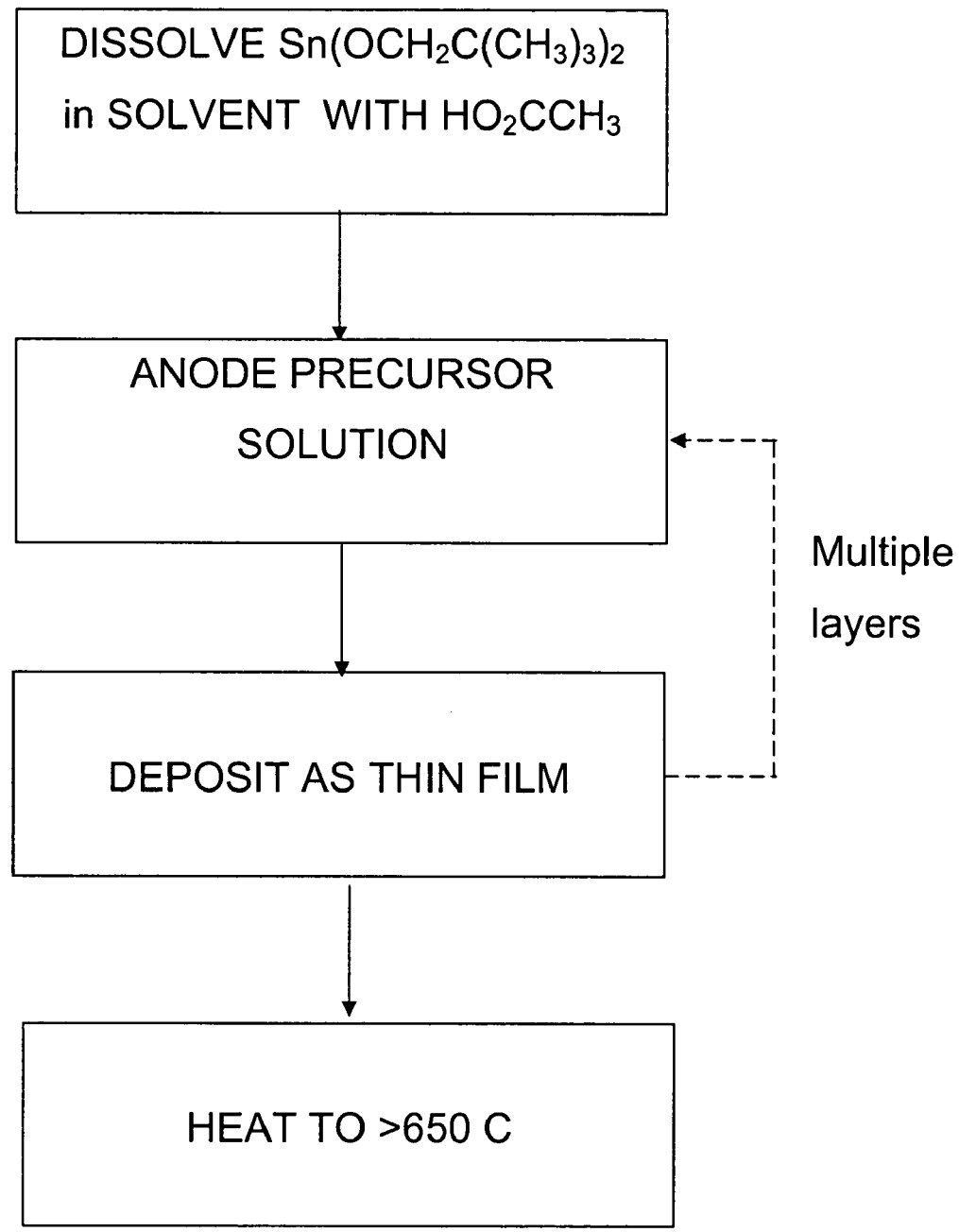
FIG. 1 illustrates the method of the present invention for preparing a thin film anode.

The present invention is a method for forming a thin film anode and a thin film cathode for use in a thin film battery. Using a solution-route synthesis, alkoxide compounds are used to form thin films which can be processed to form an anode and a cathode that have been shown to be capable of being electrochemically cycled (that is, charged and discharged). In the method of the present invention, a precursor solution is first formed using an alkoxide compound of the general formula $M(OCH_2C(CH_3)_3)_x$, where M is Sn for forming a thin film anode and M is Li when forming a thin film cathode when mixed with $Co(O_2CCH_3)_2$, the precursor solution is deposited as a thin film, generally with multiple layers deposited, and then heated to an elevated temperature greater than approximately 650° C. to crystallize the ceramic material (T. J. Boyle, D. Ingersoll, R. T. Cygan, M. A. Rodriguez, K. Rahimian, and J. A. Voigt, "All-Ceramic Thin Film Battery, SAND2002-3615, Sandia National Laboratories Technical Report, 2002; incorporated herein by reference). Each thin film layer has a thickness of approximately 500–1000 angstroms (Å) and generally multiple layers are deposited. Deposition can be accomplished using standard thin film deposition techniques, such as spin coating.

In forming the thin film anode electrode, $Sn(OCH_2C(CH_3)_3)_2$ is dissolved in a solvent, such as toluene (or other solvents such as hexanes, tetrahydrofuran, and pyridine) with $HO_2CCH_3$ present to form an anode precursor solution. The anode precursor solution is then deposited as a thin film, such as by spin-coating deposition, in the presence of water vapor on a surface with a thickness of the thin film of approximately 500–1000 Å. When the anode thin film is used as part of a thin film battery, the surface can be a standard substrate, such as Si and Pt, or the electrolyte layer. The thin film is heated to elevated temperatures, typically above approximately 600° C. to crystallize the ceramic material.

Initial investigations of the synthesis of the thin film anode suggested that tin oxide can function as an acceptable anode for lithium ion batteries. Therefore, work was undertaken to synthesize a sol-gel precursor solution to generate cassiterite thin films. The synthesis of Sn(II) alkoxides was attempted using tridentate (tris(hydroxymethyl ethane, $(OCH_2)_3C(CH_3)$, THME-$H_3$) and monodentate (neo-pentoxide, $OC_5H_{11}$, ONep) ligands. The THME-ligated species did not form high quality films due to their relative stability in the presence of ambient water. In studies with the monodentate ligands, the Sn(II) derivative was synthesized through the use of an amide-alcohol exchange reaction using $[Sn(NMe_2)_2]_2$ and HONep (see Equation 1), where Me is shorthand notation for $CH_3$ and ONep signifies $OCH_2C(CH_3)_3$. The product isolated was the polymeric Sn(II) alkoxide, $[Sn(\mu\text{-}ONep)_2]_n$ where n signifies an arbitrarily large integer (Boyle, U.S. Pat. No. 6,414,174; incorporated herein by reference). Through $^{119}$Sn NMR experiments, the polymeric Sn(II) alkoxide compound was found to be disrupted into smaller oligomers in solution. The introduction of water (typically through water vapor in ambient atmospheres) is critical to the formation of the cross-linked film network that is necessarily formed during spin-coat deposition processes. Titration of the Sn(II) alkoxide compound with $H_2O$ led to the identification of two unique hydrolysis products characterized by single crystal X-ray diffraction as $Sn_5(\mu_3\text{-}O)_2(\mu\text{-}ONep)_6$ and $Sn_6(\mu_3\text{-}O)_4(\mu\text{-}ONep)_4$ (see Equation 2). These compounds were further identified by multinuclear ($^1$H, $^{13}$C, $^{17}$O, and $^{119}$Sn) solid state MAS and high resolution, solution NMR experiments. Based on these studies, it was determined that while the central core of the solid-state structures of the hydrolysis products are retained, dynamic ligand exchange leads to more symmetrical molecules in solution.

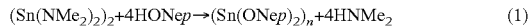  (1)

  (2)

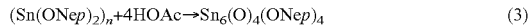  (3)

where HOAc is $HO_2CCH_3$ and w, x, y, and z are numbers that depend on n; for example, if n=2/5, then w=5, x=2, y=6 and if n=2/3, w=6, x=4, y=4. For other values of n, a mixture of species can be obtained.

It was also determined that $(Sn(ONep)_2)_n$ could be isolated from the reaction of $Sn(ONep)_2$ with HOAc (see Equation 3). Due to the simplicity of synthesis and high quality of films generated from this solution it was used as the standard route. In a standard synthesis for the precursor solution, $Sn(ONep)_2$ was slurried in toluene and four equivalents of HOAc were added. The mixture was stirred for an hour and films were deposited as previously described. A simple scheme is depicted in FIG. 1. Typically, several layers were deposited, such as three layers, and the final film fired at 650° C. The films generated were found to be extremely uniform and defect free by scanning electron microscopy (SEM) analysis. X-ray diffraction (XRD) analysis of the film showed that the major phase was cassiterite ($SnO_2$).

Figure 2:
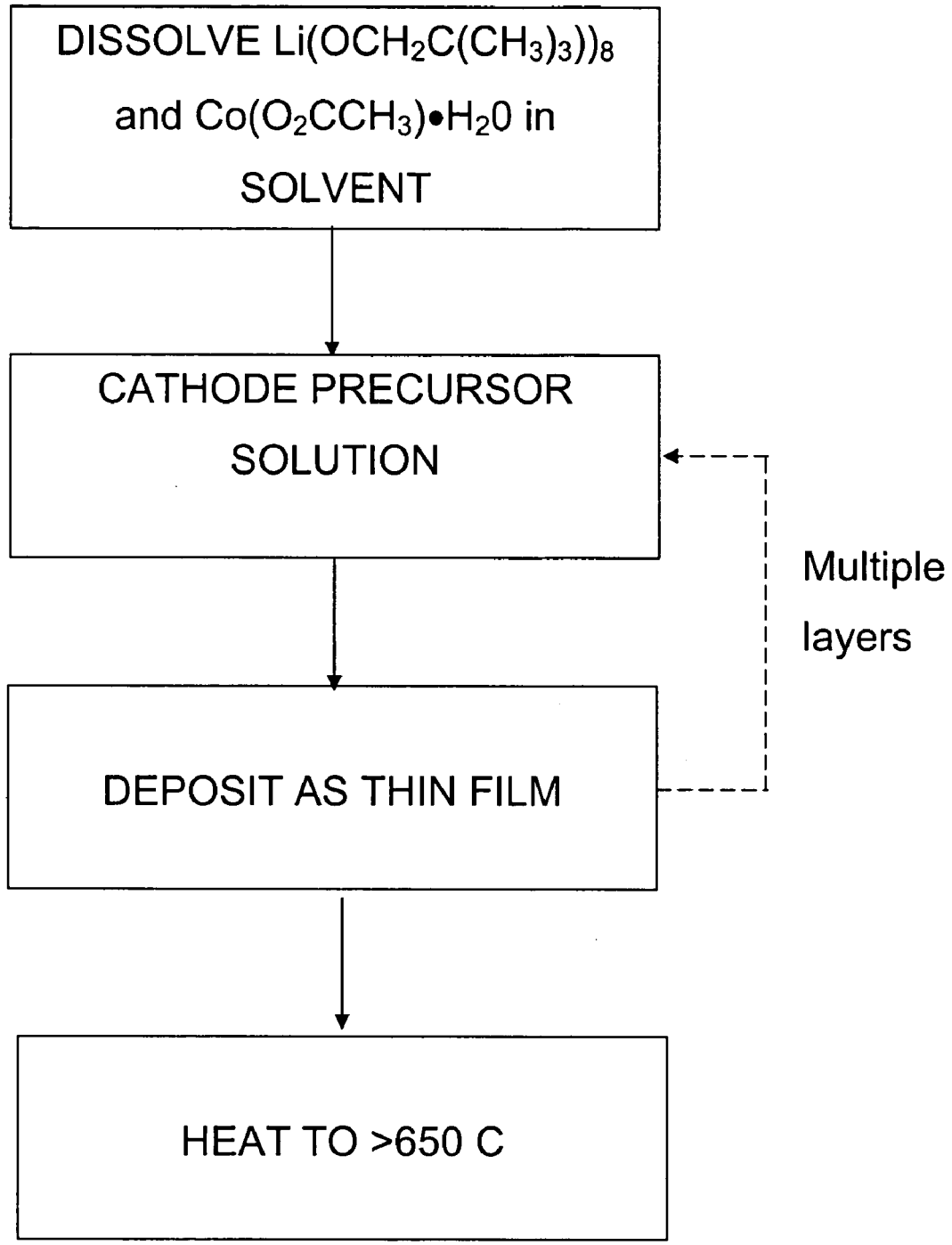
FIG. 2 shows the cyclic voltammagram of the first and second cycles of a thin film anode prepared according to the method of present invention.

The film properties were evaluated for electrochemical properties, using standard techniques. The films demonstrated a oxidation/reduction (redox) waves, but on the first cycle the material becomes electrochemically inactive. FIG. 2 shows the first and second cycles of the final films. XRD analyses indicates that the film had been converted from $SnO_2$ to $Sn^0$. The resultant material functions as a reversible anode through the reversible formation of a Li alloy on charge/discharge.

Several oxides were considered for use as 4 V cathode materials for Li-based batteries. These include the spinel $LiMn_2O_4$ and the layered oxides $LiMO_2$ (M=Co, Ni). Each of these cathode materials has advantages and disadvantages that impact their further development for lithium-ion batteries. For example, the capacity of the Mn material is low in comparison to the layered oxide materials, and in the case of the Ni-based oxides the synthesis of high-quality materials is problematic. For these and other reasons, $LiCoO_2$ is often the material of choice for use as the cathode in Li-ion batteries.

For use in a thin film battery, the cobalt oxide is intended as the cathode material and first layer of a subsequent thin film assembly of anode, electrode and electrolyte. $LiCoO_2$ is an anisotropic material having a layered structure through which $Li^+$ moves during charge/discharge to ensure electroneutrality of the film. Consequently, the edge planes of the oxide must be accessible to the electrolyte, and in the solid-state layered system envisioned for use in a thin film battery, this necessitates formation of the oxide film in a preferred orientation. Hence, work was undertaken to match the lattice of the metal support with the $LiCoO_2$ materials. While $Au^0$ appeared to be the best match, after several attempts using both sol-gel and sputtered $LiCoO_2$, oriented materials could not be realized. Therefore, standard stacks using $Si/SiO_2//Pt$ were used.

Figure 3:
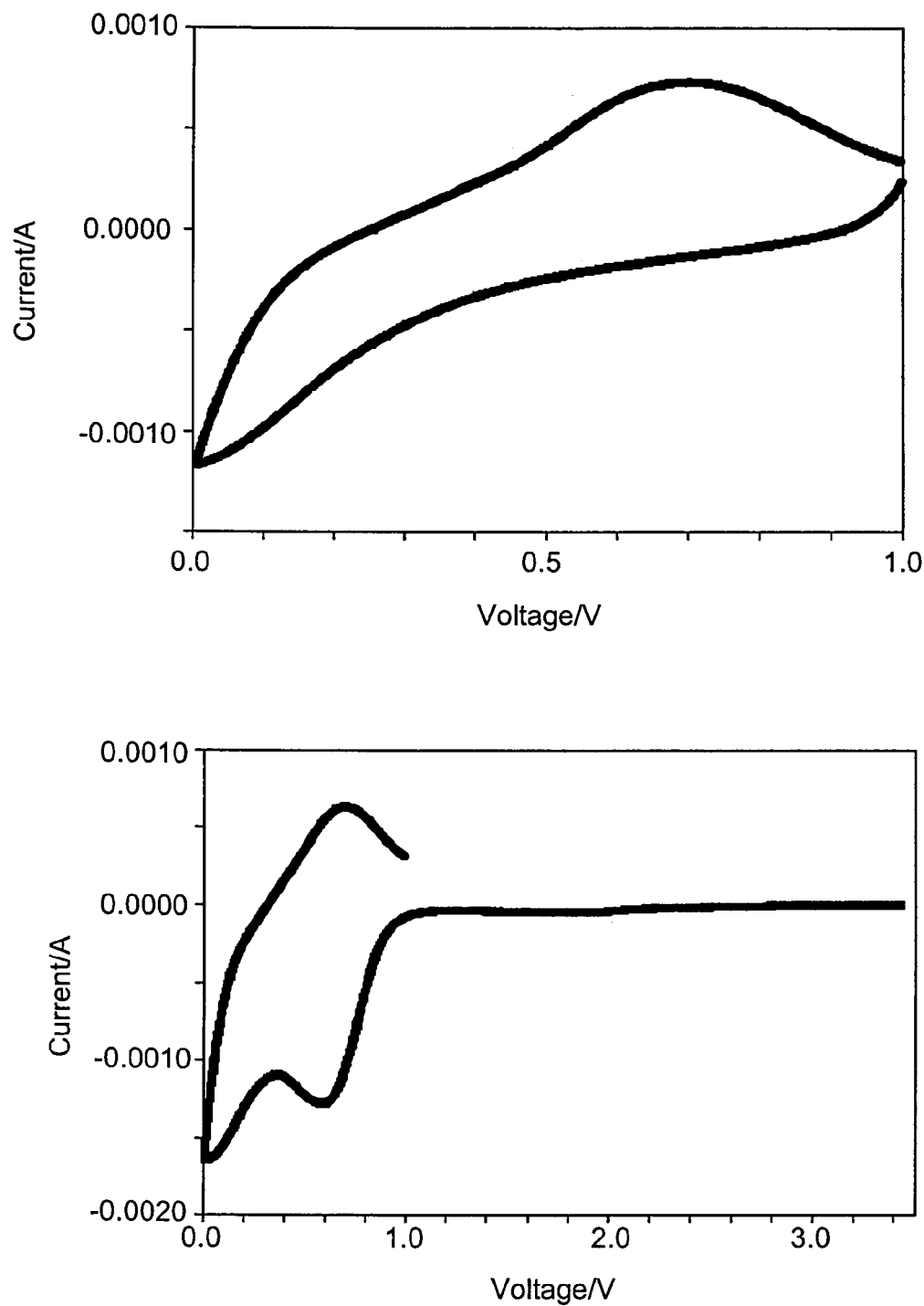
FIG. 3 illustrates the method of the present invention for preparing a thin film cathode.

Initially, an all amide route was attempted to generate a suitable cathode precursor solution, but the thin films generated from the prepared solutions did not form uniform films. Therefore, another solution route was attempted and a suitable thin film cathode material was prepared similarly to the preparation of the thin film anode material. In forming the thin film cathode electrode material, $(Li(OCH_2C(CH_3)_3))_8$ and $Co(O_2CCH_3) \cdot H_2O$ are dissolved in a solvent, either separately or together, with the solvent being a polar solvent such as toluene or pyridine to form a cathode precursor solution, and more particularly, a $LiCoO_2$ cathode precursor solution (see FIG. 3). $Li(OCH_2C(CH_3)_3))_8$ and $Co(O_2CCH_3) \cdot H_2O$ can be mixed together and then dissolved in a solvent or each separately dissolved in a solvent and then mixed.

This precursor solution is deposited as a thin film in a manner similar to that used for the anode precursor solution, such as by spin-coat deposition, with multiple thin film layers generally formed. Each thin film layer has a thickness of approximately 500–1000 Å. When the cathode thin film is used as part of a thin film battery, the surface can be a standard substrate, such as $Si/SiO_2//Pt$. The thin film is heated to elevated temperatures, typically above approximately 650° C. to form a perovskite phase of the material.

The various structural changes noted in the thin film over processing temperature were followed by XRD. The formation of the textured $LiCoO_2$ film was demonstrated by a peak at approximately 18.5° 2θ. This broad peak starts to form at approximately 600° C. and is clearly detectable at 800° C. Additional peaks (above 30° 2θ) in the patterns are from the Pt electrode and Si substrate.

Figure 4:
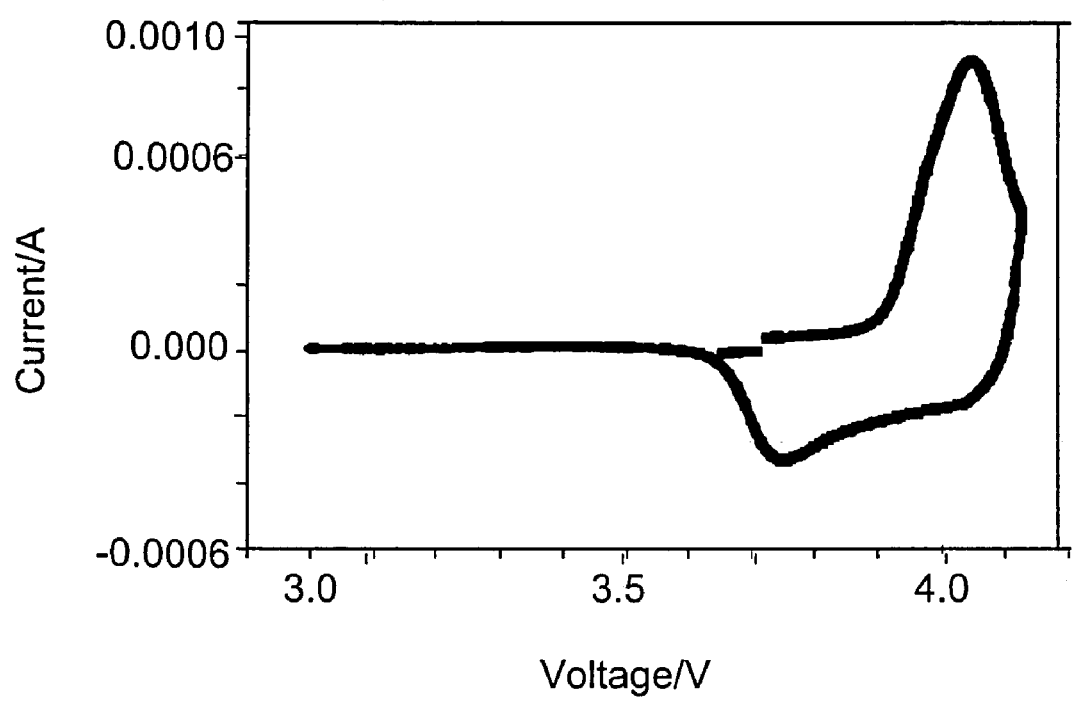
FIG. 4 shows the cyclic voltammagram of a thin film cathode prepared according to the method of present invention.

One cathode material prepared according to the method of the present invention proved to be electrochemically active and was studied by XRD throughout the process, with the electrochemical properties of these films investigated using standard methods. A typical cyclic voltammagram for a multi-layer thin film cathode material prepared according to the method of the present invention is shown in FIG. 4. It was determined that the films were re-cycleable in the battery sense.

XRD data were taken for the $LiCoO_2$ films at various stages of discharge. The XRD data for the film prior to heating to elevated temperature showed very little crystallization behavior; this is seen by the lack any peak intensity at approximately 18.5° 2θ. Diffraction patterns for samples tested after heating to elevated temperature and after cycling looked essentially the same qualitatively. However, there are some subtle details that could give some structural insight as to what is happening in these films. Specifically, the 2θ region of 17–21° 2θ showed a peak doublet for all the annealed films but there are some changes to these peak positions depending on the electrochemical conditions.

The invention being thus described, it will be apparent to those skilled in the art that the same may be varied in many ways. Such variations are not to be regarded as a departure from the spirit and scope of the invention, and all such modifications are intended to be included within the scope of the following claims.

I claim:

1. A method for making an electrode, comprising synthesizing a precursor solution, said precursor solution selected from an anode precursor solution and a cathode precursor solution, wherein said anode precursor solution is formed by dissolving $Sn(OCH_2C(CH_3)_3)_2$ in a solvent in the presence of $HO_2CCH_3$ and wherein said cathode precursor solution is formed by dissolving a mixture of $(Li(OCH_2C(CH_3)_3))_8$ and $Co(O_2CCH_3) \cdot H_2O$ in at least one polar solvent, depositing at least one thin film layer using said precursor solution, and heating said at least one thin film layer to a temperature greater than approximately 650° C.

2. The method of claim 1 wherein said solvent is selected from toluene, hexane, tetrahydrofuran, and pyridine.

3. The method of claim 1 wherein said at least polar solvent is selected from pyridine, tetrahydrofuran, and toluene.

4. The method of claim 1 wherein said at least one thin film layer has a thickness between approximately 500 Å and 1000 Å.

5. The method of claim 1 wherein said step of depositing at least one thin film layer is performed using a spin-coat deposition technique.

6. The method of claim 1 wherein said step of depositing at least one thin film is performed in the presence of water vapor.

* * * * *